June 24, 1941.  H. ANDERSON  2,247,110
GLUE APPLICATOR
Filed Jan. 23, 1939   9 Sheets-Sheet 3

INVENTOR.
HELMER ANDERSON
BY
ATTORNEY

INVENTOR.
HELMER ANDERSON
BY Robert E. Sadtler
ATTORNEY

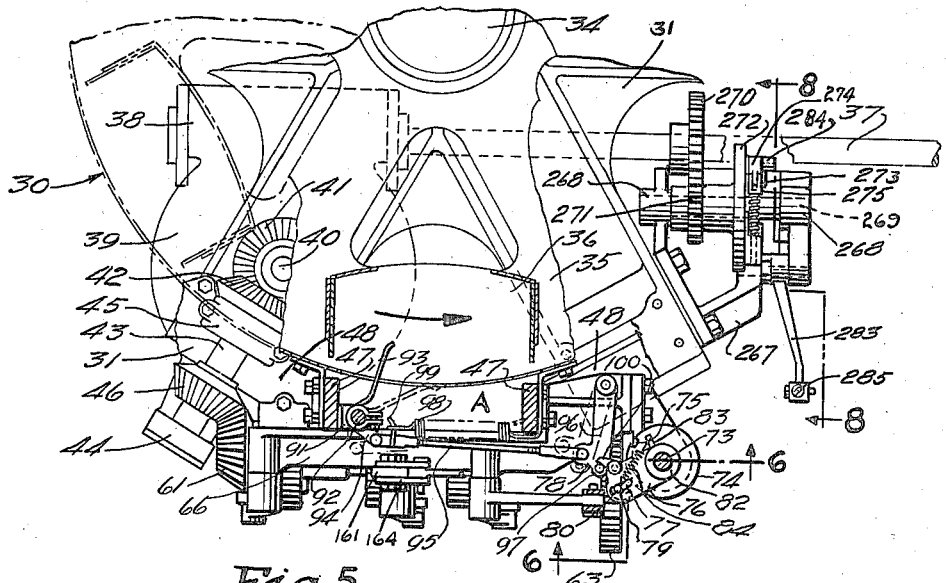

June 24, 1941.  H. ANDERSON  2,247,110
GLUE APPLICATOR
Filed Jan. 23, 1939   9 Sheets-Sheet 6

INVENTOR.
HELMER ANDERSON
BY Robert E. Sadler
ATTORNEY

INVENTOR
HELMER ANDERSON

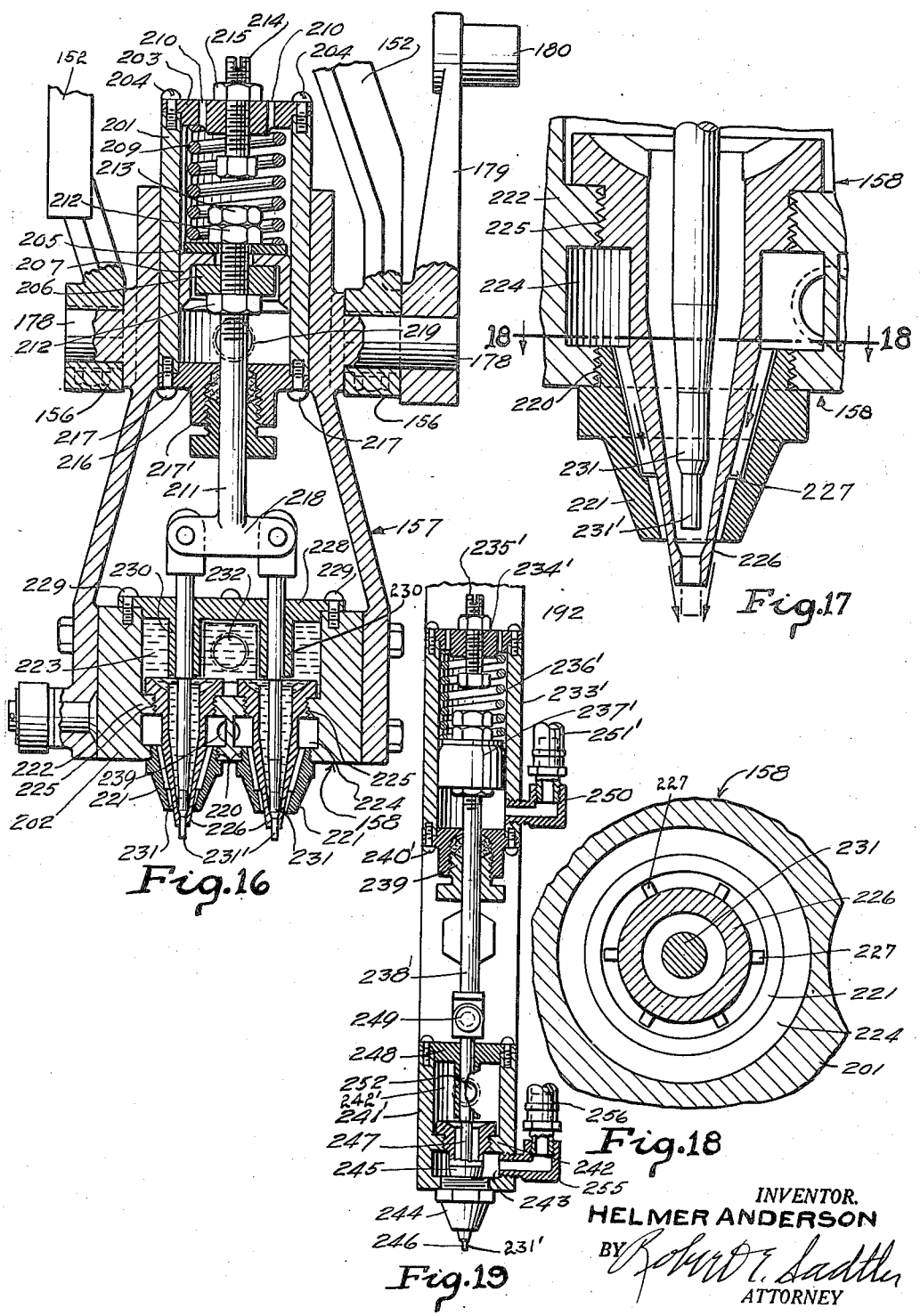

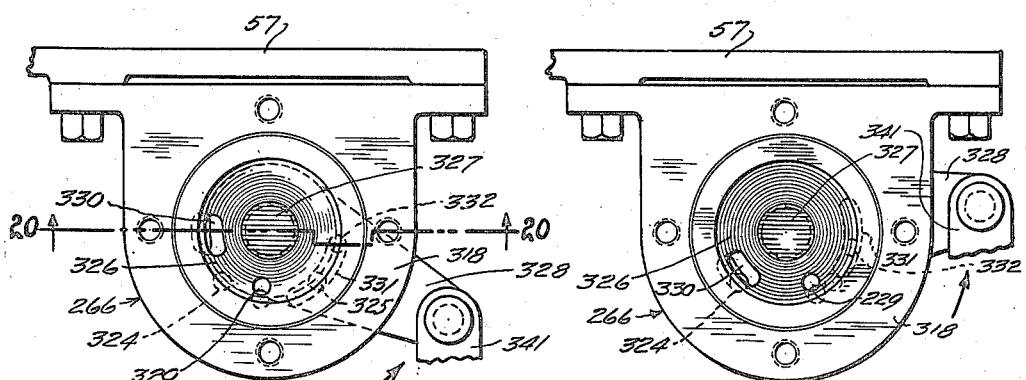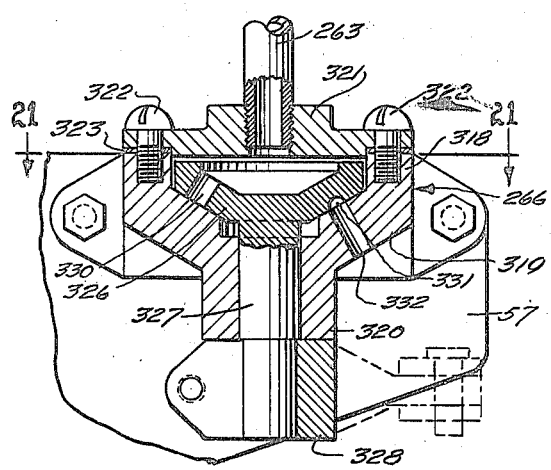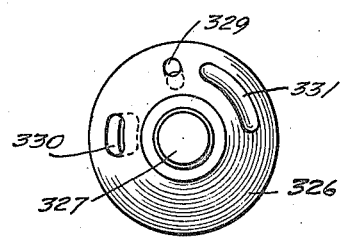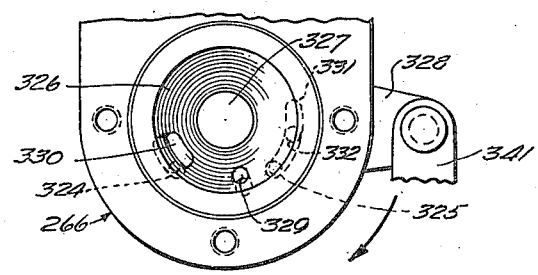

Patented June 24, 1941

2,247,110

UNITED STATES PATENT OFFICE 2,247,110

GLUE APPLICATOR

Helmer Anderson, Minneapolis, Minn., assignor to General Mills, Inc., a corporation of Delaware Application January 23, 1939, Serial No. 252,506

14 Claims. (Cl. 93—6)

This invention relates to gumming applicators for applying adhesive to the mouth parts of bags intended to be held closed by such adhesive.

An object of the invention is to provide a novel machine of the character which may be used in connection with and as an attachment to a typical packaging machine adapted to fill paper bags with weighed or otherwise measured quantities of material.

Another object of the invention is to provide a novel means to hold the bag closed against access of any of the adhesive to the bag contents and yet to hold the mouth of the bag open so that adhesive may be applied to the inner surface thereof.

Another object of the invention is to provide a novel arrangement of operating mechanisms for raising and lowering such gumming heads.

Still another object of the invention is to provide a novel grouping and means for operating such gumming heads wherein a middle gumming head and a pair of side gumming heads, on opposite sides of the middle head, are provided with means for lowering and raising the middle head and oscillating the same and with means for alternately lowering and raising the side heads in unison with the oscillations of the middle head.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Fig. 5 is a horizontal sectional view on the line 5—5 of Fig. 1.

Fig. 6 is an enlarged detail section on line 6—6 of Fig. 5.

Fig. 7 is a reduced section on the line 7—7 of Fig. 6 showing a pawl and clutch disk used herein with the pawl engaged.

Fig. 8 is a section on the line 8—8 of Fig. 5 showing an air shut off governor used herein.

Fig. 16 is an enlarged fragmentary vertical sectional view on the line 16—16 of Fig. 10, showing a center gumming head used herein.

Fig. 17 is an enlarged axial section of a nozzle shown in Fig. 16.

Fig. 18 is a section on the line 18—18 of Fig. 17.

Fig. 19 is an enlarged section of the line 19—19 of Fig. 11 showing one of the gumming heads.

Fig. 20 is a sectional view on line 20—20 of Fig. 21, showing a section through one of the air control valves used herein.

Fig. 21 is a section of Fig. 20 on the line 21—21, showing certain valve ports.

Fig. 22 is a view similar to Fig. 21, showing the ports partly opened.

Fig. 23 is a view similar to Fig. 21 but showing the ports fully opened.

Fig. 24 is a view similar to Fig. 21 but showing still another position of the valve.

Fig. 25 is a detail bottom view of the valve and stem, showing the ports.

Fig. 26 is a vertical sectional view on the line 26—26 of Fig. 3 showing a gum tank used herein.

Figure 1:
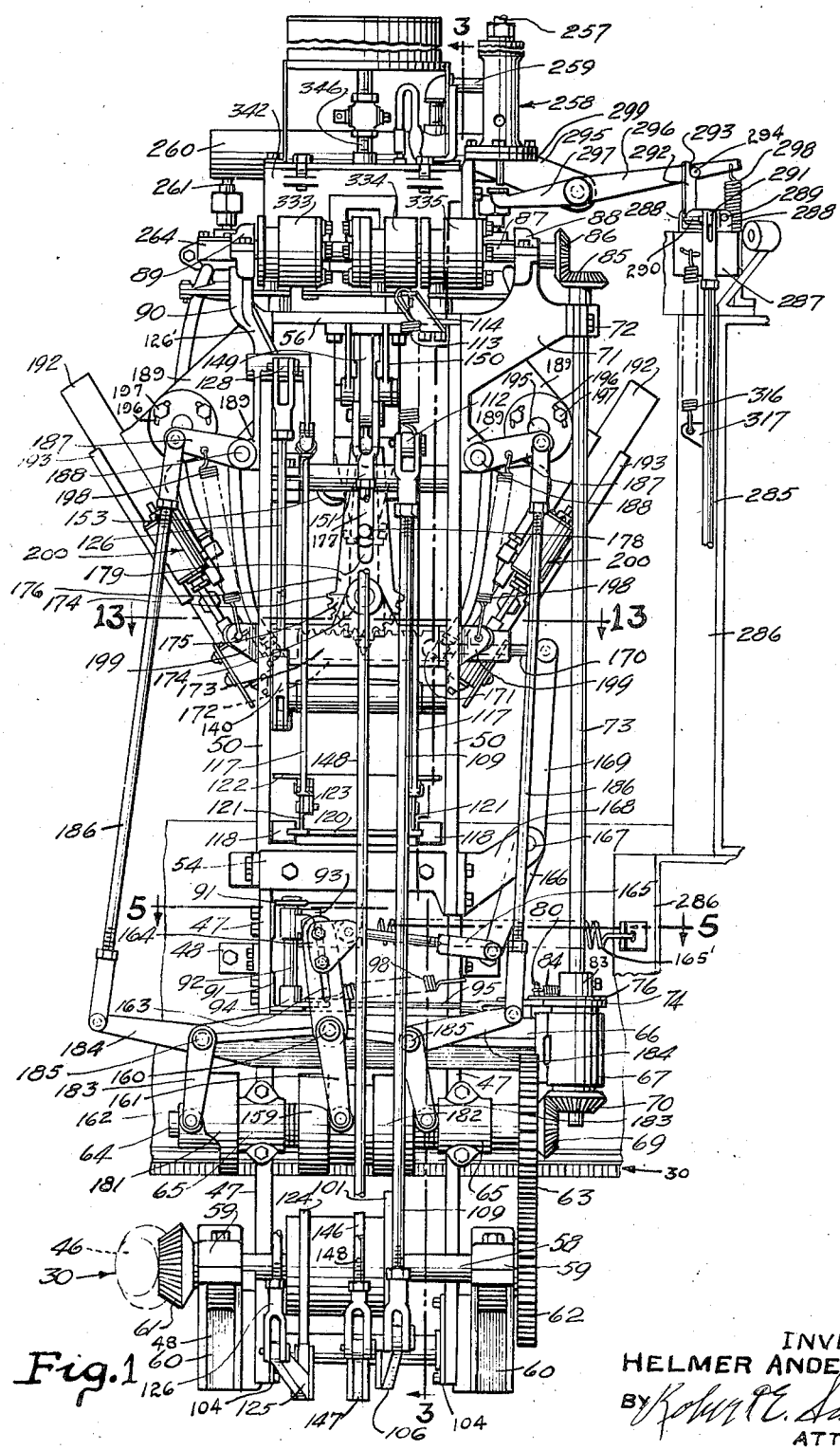
Fig. 1 is a front elevation of the novel package gumming machine.

This applicator is for use in applying gum to the mouths of bags which have been filled by a packaging machine and constitutes an attachment for such a packaging machine. While the device may be used with various forms of packaging machines those parts of one such machine which directly relate to the present applicator will first be described, it being clearly understood that variations may be made in the packaging machine without necessitating variations in the applicator although variations may be made in the construction of the applicator without departing from the scope of the invention as set forth in the claims hereto appended.

This packaging machine is indicated in general at 30 and includes a main frame 31 only a part of which is shown in the drawings. The main frame 31 is provided with legs 32 and mounted on the lower ends of the legs are casters 33 so that the machine may be moved from place to place as may be desirable. As shown best in Fig. 5 a vertical axle 34 is fixed to or formed with the main frame and projects upwardly therefrom. Mounted rotatably on the axle 34 is a conveyor disk 35 having a series of package or bag holding compartments 36 opening outwardly from the disk to enable bags to be inserted and removed and these compartments are open at the top to permit the top parts of the bags to project thereabove for purposes which will be present explained. The disk 35 is rotated at intervals by any suitable means which is not here shown, as the same forms no part of the present invention. The rotation takes place in the direction of the arrow in Fig. 5 and by such rotation the compartments are brought successively to a gumming station A, the disk being stopped long enough to permit the bag in the compartment at the gumming station A to undergo the gumming operation. At 37 is shown a shaft driven from the packaging machine and suitably journalled therein. This shaft operates through a reduction gearing preferably of the worm and worm wheel type, the casing for the worm being indicated at 38 and that for the worm wheel being shown at 39. The worm wheel is fixed on a shaft 40 which projects upwardly through the casing 39 and carries on its upper end a bevel gear 41 which meshes with a bevel gear 42 fixed on a shaft 43 which is journalled in suitable bearings such as are shown at 44 and 45. Also fixed on the outer part of the shaft 43 is a bevel gear 46, the purpose of which will be presently apparent.

*The gumming machine frame*

The gumming machine itself has its working parts supported by a frame having a lower section and an upper section. The lower frame section consists of a pair of parallel and vertically disposed bars 47 which are supported from the frame 31 by brackets 48 shown clearly in Figs. 2 and 5. The upper ends of the frame bars 47 are connected by a cross bar 49 (Fig. 3).

Figure 3:
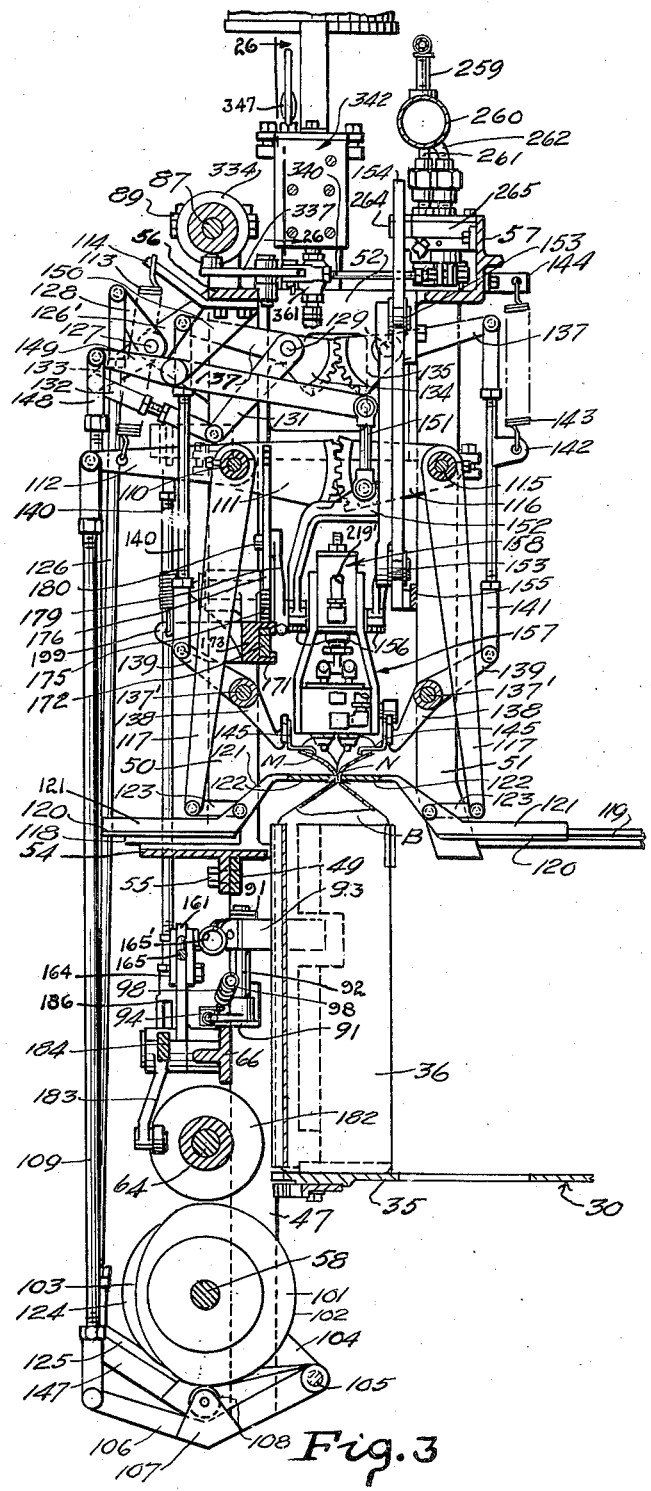
Fig. 3 is a vertical sectional view on line 3—3 of Fig. 1.

The upper frame includes a spaced and parallel pair of side frames of inverted U-shape each having a forward leg 50, a rear leg 51, and a connecting section 52 extending between the top portions of the legs 50 and 51 (Fig. 3). The lower ends of the legs 50 are connected by a T-shaped cross bar 54 which has its stem connected to the cross-bar 49 by bolts 55, thus joining the upper and lower frame portions. The upper ends of the legs 50 are connected by a cross-bar 56 and the upper ends of the legs 51 are connected by an irregularly shaped casting 57.

*The driving arrangement*

A main drive shaft 58 is journalled in bearings 59 supported from the frame bars 47 by brackets 60. On one end of the shaft 58 is fixed a bevel gear 61 which meshes with the gear 46 and thus the shaft 58 is driven. On the other end of the shaft 58 is fixed a spur gear 62 which meshes with a spur gear 63 fixed on a cam shaft 64 which is journalled in bearings 65 supported by the bars 47.

A cross-bar 66 is fixed on the frame bars 47 and on the right hand end (Figs. 1 and 6) of this cross-bar is fixed a vertical bearing 67. Journalled in the bearing 67 is a sleeve 68. The shaft 64 has fixed thereon a bevel gear 69 which meshes with a bevel gear 70 formed on the lower end of the sleeve 68.

Fixed to the right hand member 50 (Fig. 1) is a bracket 71 carrying a bearing 72 vertically alined above the sleeve 68. In the bearing 72 and sleeve 68 is journalled a shaft 73. In order to drive the shaft 73 at the proper time (Figs. 6 and 7) the following mechanism is employed. On the upper end of the sleeve 68 is fixed a clutch disk 74 having a notch 75 at one point in its periphery. Keyed to the shaft 73 above the disk 74 is an arm 76 having an arcuate slot 77 at its outer end. A pawl 78 is pivoted to the arm 76 as at 79 and carries a pin 80 which projects through the slot 77. The pawl 78 is provided with a nose 81 adapted to enter the notch 75. The arm 76 is provided with a hub 82 from which projects a pin 83 connected by a spring 84 with the pin 80. The spring tends to force the pawl into the notch 75 to cause the shaft 73 to rotate with the sleeve 68 but, at certain phases in the operation, as will be described, the pawl is disengaged from the disk 74 and the shaft 73 ceases to rotate.

On the upper end of the shaft 73 is fixed a bevel gear 85 which meshes with a bevel gear 86 carried on the right hand end (Fig. 1) of an upper cam shaft 87. At its right hand end the shaft 87 is journalled in a bearing 88 carried by the bracket 71. At its other end the shaft is journalled in a bearing 89 supported by a bracket 90 from the left hand member 50. Obviously this shaft 87 operates only when the shaft 73 is in operation.

*The pawl releasing mechanism*

Prior to the bag reaching station A (Fig. 5) it is necessary that the shafts 73 and 87 be at rest. When the bag reaches station A it is desirable that these shafts rotate with the shafts 58 and 64. To effect this, there is mounted on the left hand member 47 (Fig. 1) a vertically spaced pair of bearing brackets 91 wherein is journalled a rock shaft 92. On the upper part of this shaft there is fixed a finger 93 in the form of an angled plate and this finger is held to normally project into the path of the bag as shown in full lines in Fig. 5. On the lower part of the shaft 92 is fixed a rock arm 94 to which is pivoted one end of a link or connecting rod 95. Pivoted on the member 66 is an arm 96 carrying a pin 97. A spring 98 has one end secured to the right hand member 47 and its other end engaged on a pin 99 projecting from the left hand end of the link 95.

The spring 98 normally urges the arm 96 into the path of the bag holder 36. This causes the pin 97 to engage the tail 100 of the pawl as shown in Figs. 5 and 7 and thus lifts the pawl so as to cause the disk 74 to move freely with respect to the shaft 73. When a bag filled compartment 36 reaches station A in its travel in the direction of the arrow shown in Fig. 5 the arm 93 will be engaged by the bag and moved to the dotted line position there shown. This will effect rocking of the shaft 92 and consequently of the arm 94 which, through connection by the link 95 will move the arm 96 and free the pin 97 from the tail 100. As this occurs the spring 84 will force the nose 81 inwardly and, upon rotation of the disk 74, the notch 75 will be brought opposite the nose so that the nose will engage in the notch 75. This will then effect rotation of the shaft 73, arm 76 and pawl 78. After the necessary operations have been performed on the bag and it has been moved from station A, the spring 98 will force the arm 93 to its full line position whereupon the pin 97 will move into the path of the revolving tail and force the pawl nose 81 out of the notch 75 thus freeing the shaft 73 from rotation with the sleeve 68.

The bag holding and mouth forming mechanism

Figure 2:
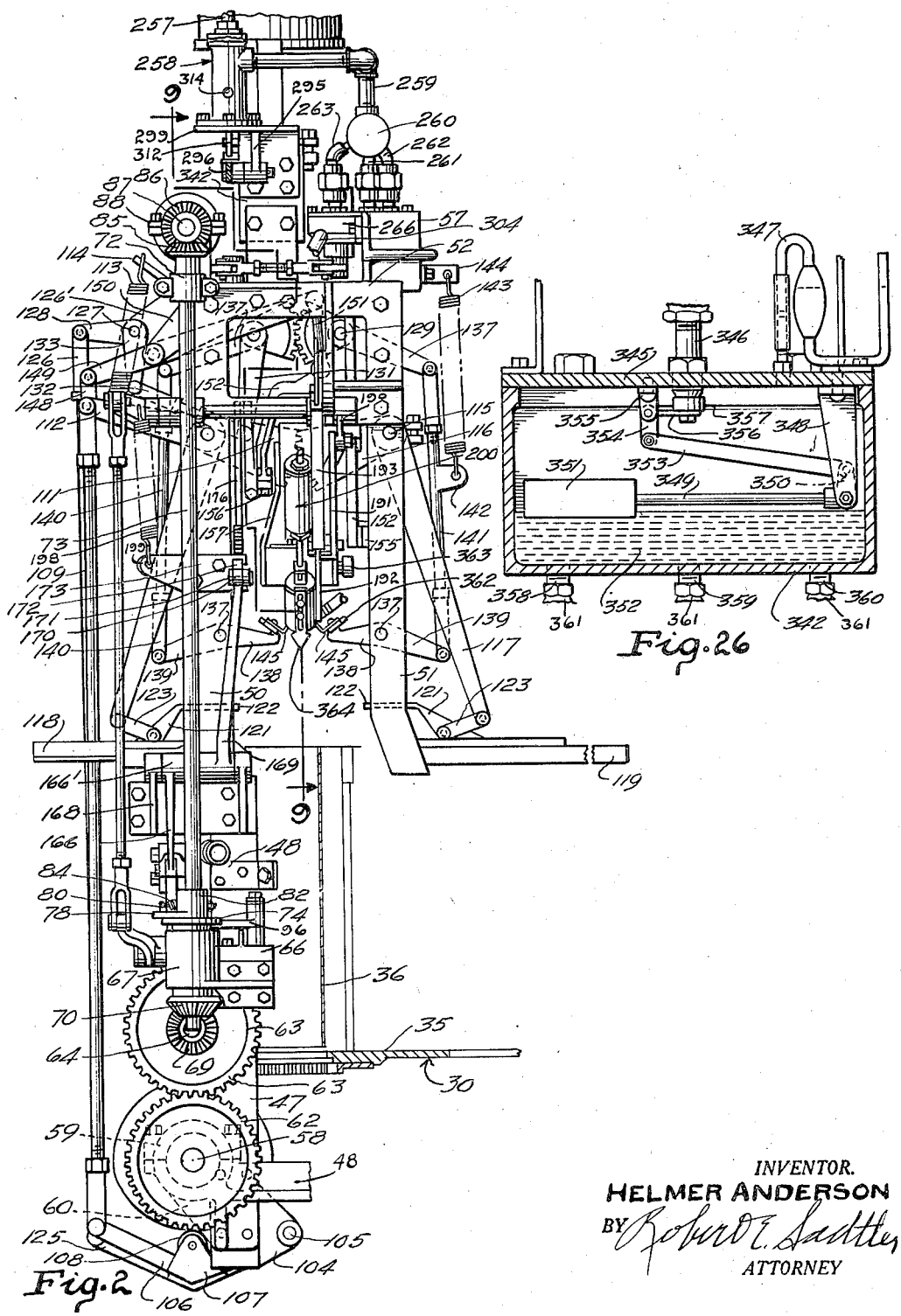
Fig. 2 is a view showing the mechanism in the bag receiving position.

Referring particularly to Figs. 2 and 3 it will be seen that there is shown a bag B as it appears at station A and that the bag is provided with a portion N compressed to form a neck and with a mouth M. The means for forming the neck will first be considered.

On the shaft 58 is fixed a cam disk 101 having about one-half its periphery concentric with the shaft 58 to form a dwell portion 102. The low spot 103 of the cam is opposite the center of the dwell. Brackets 104 are carried by the lower ends of the members 47 and these brackets support a transverse shaft 105. On the shaft 105 is rockingly mounted the rear end of a bent lever 106 which is provided centrally with a yoke 107 wherein is revolubly mounted a cam roller 108. Pivoted to the forward end of the lever 106 is a link 109 which extends upwardly from its pivoted end. Extending between the legs 50 is a shaft 110 whereon is mounted a lever having a gear segment 111 forming its rear arm and a forwardly extending arm 112 to which the upper end of the link 109 is pivotally connected. A coiled tension spring 113 has its lower end connected to the lever arm 112 and its upper end connected to a bracket 114. This spring thus urges the arm 112 upwardly and by means of the link 109 keeps the lever 106 raised so that the cam roller 108 is constantly in contact with the cam 101.

The members 51 support a transverse shaft 115 whereon is fixed a gear segment 116 which meshes with the segment 111 so that rocking of the shaft 110 causes like rocking of the shaft 115. Fixed on each of the shafts 110 and 115 is a pair of laterally spaced rock arms 117 which depend from the shafts. Mounted on the lower part of the frame members 50 is a pair of laterally spaced grooved guide bars 118 and on the frame members 51 similar grooved guide bars 119 are alined with the bars 118, the adjacent ends of bars 118 and 119 being spaced to allow passage of the bag holders 36 and the upper parts of the bags B as shown in Fig. 3. Slidable in the grooves of each pair of guide bars is a plate 120 and from each of these plates extends a pair of arms 121, each pair of which inclines upwardly and convergingly toward the pair of the other plate. The upper and adjacent ends of each pair of arms 121 carries a neck forming blade 122 which blades are in opposed alinement.

Links 123 connect the lower ends of the arms 117 with the slides just described.

In the operation of this portion of the invention, rotation of the shaft 58 from the shaft 37 causes rotation of the cam 101 which, with the spring 113, effects oscillation of the lever 106. This in turn effects oscillation of the gear segments which swing the lower ends of the arms 117 toward each other and thus move the blades 122 from the open position shown in Fig. 2 to the closed position shown in Fig. 3. It will be seen that the cam roller 108 rests on the dwell 102 of the cam when the blades are closed so that once the blades have closed as in Fig. 3 they will be retained in closed position for about one-half revolution of the cam 101 and shaft 58.

Bag mouth opening mechanism

Figures 4, 13:
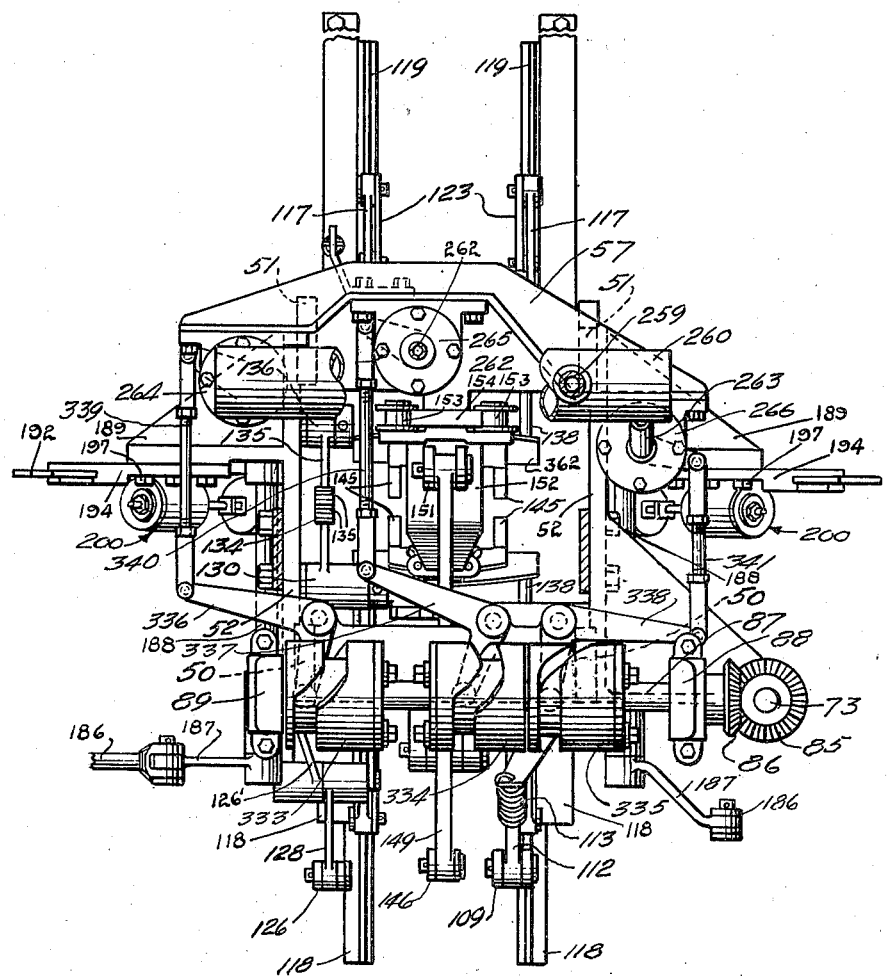
Fig. 4 is a plan view with some parts omitted to more clearly show the invention.
Fig. 13 is a horizontal detail sectional view on the line 13—13 of Fig. 1, showing a gear rack guide way used herein.

The bag mouth opening means will now be described. Fixedly connected to the shaft 58 is a cam 124, preferably termed the mouth opening cam. Rockingly mounted on the shaft 105 is a lever 125 similar in construction to the lever 106. A link 126 has its lower end pivoted to the forward end of the lever 125. A bracket 126' projects forwardly and downwardly from the member 56 and carries a stub shaft 127. On the stub shaft is pivoted a bell crank having an arm 128 to which the upper end of the rod 126 is pivotally connected. The left hand member 50 (Fig. 4) has formed integrally therewith a header bracket 52 which supports a pair of forwardly projecting stub shafts 129. On the forward shaft 129 is mounted a sleeve 130 from which a rock arm 131 extends downwardly and forwardly as best seen in Fig. 3.

The lower end of the rock arm 131 is connected by a link 132 with the remaining arm 133 of the bell crank having the arm 128. On the sleeve 130 is also carried a gear segment 134 which meshes with a gear segment 135 carried by a sleeve 136 revolubly mounted on the remaining shaft 129. Thus the sleeves 130 and 136 are caused to move in unison but in opposite directions. Projecting forwardly and rearwardly from the respective sleeves are rock arms 137. Stub shafts 137' project respectively from the members 50 and 51 and on these shafts are mounted rock levers having proximal arms 138 and remote arms 139. An adjustable link 140 connects the forward arm 137 with the corresponding arm 139 and an adjustable link 141 connects the rear arm 137 with the other arm 139. The link 141 has an eye 142 and a coiled tension spring 143 has its lower end engaged in said eye and its upper end supported by a bracket 144 fixed on the member 57. Spaced L-shaped fingers 145 are carried by each of the arms 138.

Figure 12:
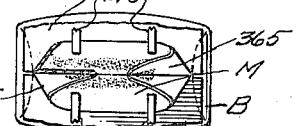
Fig. 12 is a section on the line 12—12 of Fig. 10, showing a means used herein for holding the package or bag top in gum receiving position, the view also showing the gum applied to the package or bag top.
Figures 14, 27:
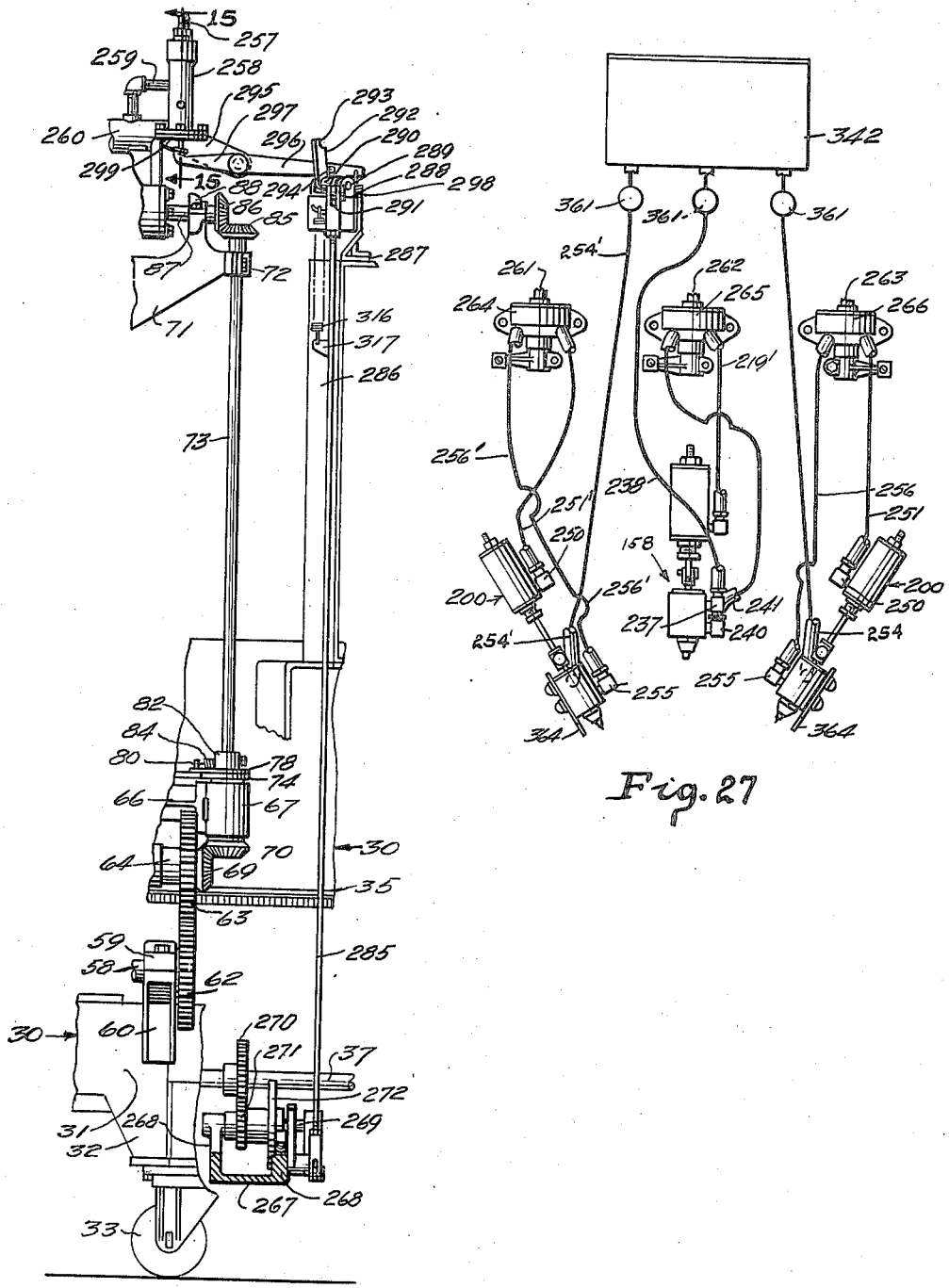
Fig. 14 is a fragmentary detail front elevation showing an air line control used herein.
Fig. 27 is a schematic view showing the gum tank, air control valves and the gum dispensing heads.

In the operation of this part of the mechanism the rotation of the cam 124 combined with the action of the spring 143 causes the rod 126 to reciprocate. This causes oscillation of the bell crank formed by the arms 128 and 133 which, through the link 132 oscillates the arm 131. This oscillation and the gear connection of this arm 131 oscillates the arms 137 which oscillates the levers having the arms 138 and 139. The movement of the arms 138 causes the fingers 145 to move from the position shown in Fig. 2 to the position shown in Fig. 3, thus engaging the bag mouth M and holding its sides apart, as clearly shown in Figs. 2 and 12 for the reception of gum.

The center gumming mechanism

Carried by the shaft 58 is a third cam 146 which actuates a lever 147 similar in construction and mounting to the levers 106 and 125. Connected pivotally to the forward end of the lever 147 is the lower end of an upstanding connecting rod 148. The upper end of the rod 148 is pivotally connected to one arm of a lever 149 pivoted intermediate its ends to a bracket 150 supported by the member 56. Pivotally connected to the other arm of the lever 149 is a depending link 151 having its lower end pivoted to a frame 152. At each end of the frame there is carried a pair of spaced rollers 153 each having a pair of flanges. These rollers roll on opposite sides of a guide bar 154 secured to the member 57 at its upper end and to a bracket 155 carried by one of the members 51. The lower end of the frame 152 is provided with alined bearings 156 wherein is journalled a tilting frame 157. Carried by the frame 157 is a central gumming unit indicated in general at 158 and specifically shown in Figs. 16 and 17. No detail reference characters have been applied to this part in the general views in order to avoid confusion. The foregoing describes the means for raising and lowering the central gumming unit.

Figure 9:
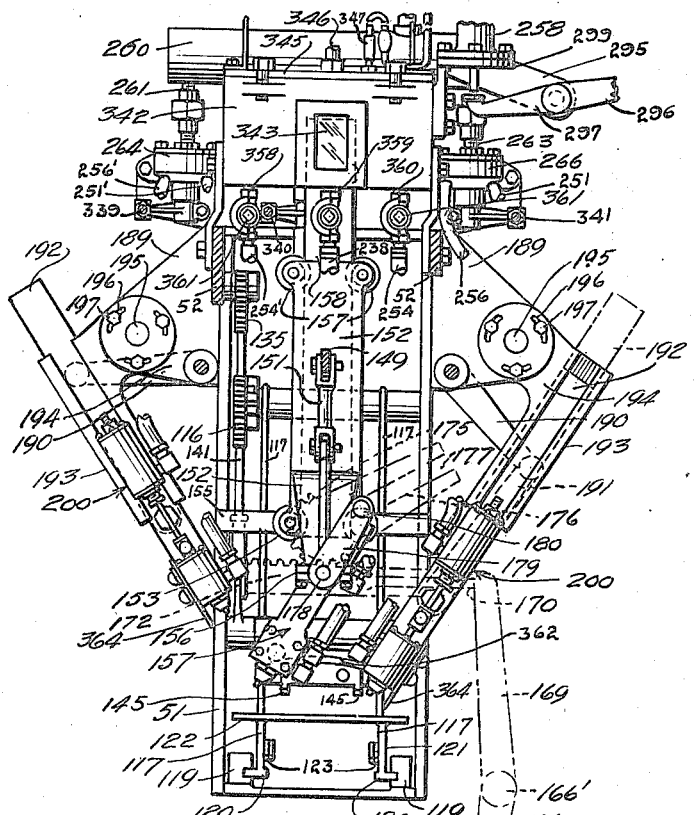
Fig. 9 is a section on the line 9—9 of Fig. 2 showing the gumming heads used herein in the initial gum applying position.
Figure 10:
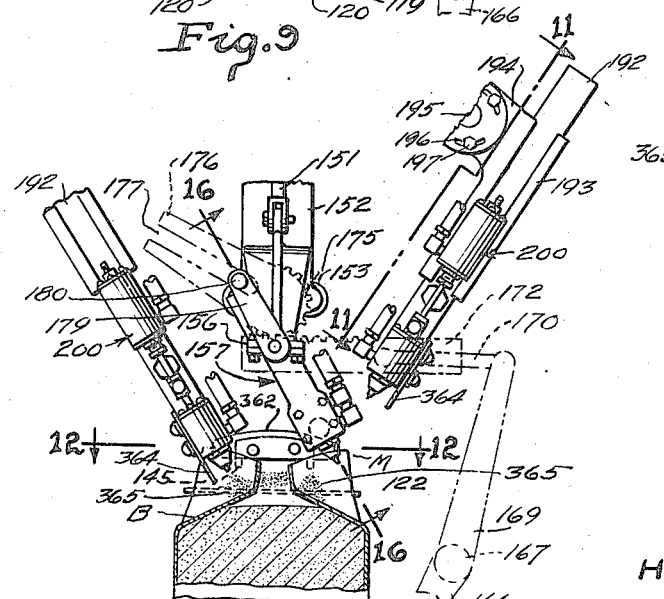
Fig. 10 is a similar section to Fig. 9 showing the gumming heads at the end of the gum application stroke and with certain parts omitted.

The mechanism for imparting a wiping motion to this unit will now be described. Referring particularly to Figs. 1, 9, and 10, there is fixed on the shaft 64 a face cam 159. On a post or stub shaft 160 projecting forwardly from the member 66 is a two armed lever 161 having a lower arm carrying a roller 162 which bears against the peripheral portion of one side face of the cam 159. The other arm of the lever 161 is provided with a longitudinal slot 163 and a bracket 164 is slidably mounted for adjustment and fixing on the arm by suitable bolts so that the active length of this arm can be controlled. The bracket 164 has one end of a link 165 connected thereto. The other end of this link 165 is connected to the lower end of a rock arm 166 projecting downwardly from a sleeve 166' rockingly mounted on a shaft 167 supported in a bracket 168 secured to the right hand member 47. Projecting upwardly from the sleeve is a rock arm 169. A link 170 has one end pivotally connected to the upper end of the arm. The other end of this link is mounted on a pin 171 projecting from the side of a rack bar 172 slidably mounted on a guide or carrier 173 supported by the frame bars 50. The carrier 173 supports a bearing 174 wherein is journalled the shaft of a gear segment 175 from which extends a normally upright blade 176 having a slot 177 therein. The frame 157 has laterally projecting journals 178 on one of which is fixed an arm 179 carrying a pin 180 mounted in the slot 177.

In the operation of the gumming mechanism rotation of the cam 146 causes oscillation of the lever 147, the latter being held raised normally as will be presently understood. Through the connecting rod 148 this motion is transmitted to the lever 149 and thus to the frame 152 and gumming head 158. The pin 180 on the frame normally lies at the outer end of the slot 177 but will move down in that slot as the cam 146 rotates to bring its high part downward thus causing the lower end of the gumming head to enter the mouth M of the bag. At the same time the shaft 64 will rotate, thus rotating the cam 159, which oscillates the lever 161 and through the link 165 causes oscillation of the rock arm 166. This causes the rock arm 169 to oscillate and pull the rack bar 172 to and fro. This oscillates the blade 176. The oscillation of the blade causes the pin 180 to effect oscillation of the frame 157 and the gumming head 158. Thus the lower end of the gumming head will be alternately raised and lowered during the rotation of the shaft 58 and will at the same time be oscillated.

Spring 165' is secured to lever 161 and to support 286 holding roller 162 against the cam surface of cam 159.

The side gumming mechanisms

On the shaft 64 is fixed a pair of cams 181 and 182 which oscillate bell crank levers 183 having lateral arms 184 extending from the pivots 185 by which they are mounted on the member 66. The outer ends of the arms 184 are connected pivotally to the lower ends of connecting rods 186 which have their upper ends connected to the ends of rock arms 187. These rock arms are fixed on shafts 188 journalled in brackets 189 and also have fixed thereon rock arms 190 connected by links 191 to frames or slides 192. The slides 192 are mounted in guides 193 having brackets 194 at their upper and inner ends which are mounted on pins 195. The brackets 194 are provided with arcuate slots 196 so that bolts 197 may extend through the brackets 189 and the slots 196 to permit angular adjustment and secure the guides in adjusted position. Springs 198 are connected to the arms 187, extend downward and are connected at their lower ends to brackets 199. On the slides 192 are mounted side gumming heads indicated in general at 200, these gumming heads being only shown in general in the main figures, the operation being indicated in Figs. 9 and 10 and the specific construction being shown in Fig. 19.

In operation, rotation of the shaft 64 rotates the cams 181 and 182 which causes oscillation of the bell cranks 183. The connecting rods 186 are reciprocated by the arms 184 of these bell cranks and consequently oscillate the rock arms or levers 187 which causes oscillation of the arms or levers 190. The oscillation of these rock levers 190, by the link connections 191 will cause reciprocation of the slides 192 in the guides 193 and consequently reciprocate the side gumming heads 200. It will be observed from Figs. 9 and 10 that when the middle gumming head is swung to the left the right side gumming head is depressed while when the middle gumming head is swung to the opposite position the left gumming head is depressed. This is to prevent interference between the middle and side heads and to effect this the cams 181 and 182 are so arranged as to effect alternate upward movements of the arms 184 in timed relation to the oscillations of the lever 162 and consequently of the middle gumming head.

The middle gumming head

In this head the frame 157 supports at its upper part an air cylinder 201 and in its lower part an adhesive dispensing casing 202 the center of which is axially alined with the cylinder 201. The upper end of the cylinder 201 has a head 203 secured thereon by screws 204. Slidable in the cylinder 201 is a piston comprising an upper plate 205, a lower plate 206 and a cup-shaped packing 207. A compression spring 209 is located between the head 205 and the plate 206 to urge the piston downwardly. Vents 210 serve to permit the influx and escape of air as the piston moves. The piston is provided with a piston rod 211 which is secured to the piston by nuts 212 and a lock nut 213. Through the center of the head 203 is a stop screw 214 having a lock nut 215 by means of which the upward movement of the piston may be adjustably limited, to control the opening of the valve and the amount of gum applied. On the lower end of the cylinder 201 is a head 216 held in place by screws. This head carries a stuffing box 217 and the piston rod 211 passes through this stuffing box and carries on its lower end a cross head 218. Between the piston and the head 216 the wall of the cylinder is provided with an air port 219. An air supply pipe 219' is connected to the port 219 by a suitable elbow.

The lower end of the casing 202 is provided with a pair of threaded openings 220 wherein are screwed a pair of air nozzles 221. In the casing 202 is a partition 222 dividing the casing into an upper adhesive compartment 223 and a lower air compartment 224. The partition 222 is provided with a pair of screw threaded openings 225 and screwed in these openings is a pair of adhesive nozzles 226 having tapered lower ends entering the air nozzles 221. The nozzles 226 are provided exteriorly with ribs 227 serving to constitute vanes for directing the flow of air between said nozzles 221 and 226. The top of the casing is closed by a head 228 secured by screws 229 and having openings alined with the nozzles and provided with tubular guide extensions 230. Through the head and its guides pass needle valves 231 which normally close the nozzles 226. The valves 231 are connected to the head 218. A port 232 serves to admit adhesive to the chamber 223 and thus to the nozzles 226 and communicates by an elbow 237 with an adhesive supply pipe 238. An air port 239 is provided for the admission of air to the chamber 224 and leads to an elbow 240 to which is connected an air supply pipe 241.

In the operation of this gumming head, air under pressure is admitted to the cylinder 201 beneath the piston which causes it to move upwardly and open the valves 231. Air under pressure is also admitted to the chamber 224 and will flow out through the spaces between the nozzles 221 and 226, thus assisting the flow of adhesive from the chamber 223 by reason of the aspirating effect of such outflowing air.

The side gumming heads

Figure 11:
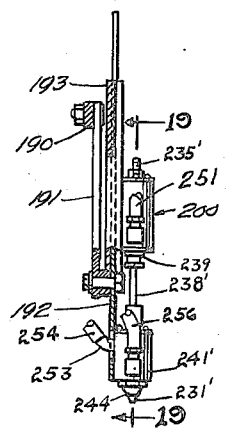
Fig. 11 is a section on the line 11—11 of Fig. 10.

As before noted there are two of these gumming heads 200 and these heads are alike in construction. Fig. 19 is a section through one such head and consists of an upper air cylinder 233' having a head 234' similar to the head 205 and like it provided with an adjustable stop screw 235'. A spring 236' urges a piston 237', of the same detail construction as the middle head piston, downwardly and a piston rod 238' is fixed to the piston 237' and extends downwardly through a stuffing box 239 carried by the lower head 240' of the cylinder 233'. This gumming head also has a lower cylinder 241' divided by a partition 242 into an upper adhesive chamber 242' and a lower air chamber 243. An air nozzle 244 and an adhesive nozzle 245 are provided in connection with this cylinder 241'. A needle valve 246 is formed on the lower end of a stem 247 which passes through the removable head 248 and is connected to the rod 238' as at 249. The construction of this part is the same as that shown in the center gumming head which is shown in Fig. 16. The cylinder 233' has an elbow 250 screwed therein to form a port for admission of air beneath the piston 237' and for connection of air pipes 251 and 251' for the two gumming heads. The cylinder 241' has a port 252 leading to the adhesive chamber 242 and an elbow 253 (Fig. 11) affords communication between this port and an adhesive supply pipe 254. An elbow 255 provides connection between the air chamber 243 and an air supply pipe 256 for the right gumming head, a similar pipe 256' supplying air to the left gumming head.

The operation of these side gumming heads is the same as that described in connection with the middle gumming head.

The air supply in general

In order to supply the necessary air for operation of the various mechanisms a suitable source of air under pressure (not shown) has a pipe 257 leading therefrom to the upper end of an air supply control valve indicated in general at 258. From this valve 258 a pipe 259 leads to an air header 260.

The header has pipes 261, 262 and 263 leading respectively to individual control valves 264, 265, and 266 for the three gumming heads and from these valves lead the pairs of pipes 251' and 256' 219' and 241 and 251 and 256. The three valves 264, 265, and 266, are of the same construction and but one of these will be described in detail.

The main air control valve and its operation

Referring especially to Figs. 1, 5, 8, 14, and 15 it will be seen that a bracket 267 is supported from the packaging machine 30 and this bracket is provided with a pair of spaced bearings 268 wherein is journalled a shaft 269 which is positioned parallel to the shaft 37. On the shaft 37 is fixed a gear 270 which meshes with a gear 271 fixed on the shaft 269. Fixed on the shaft 269 is a governor comprising a disk 272. On the disk 272 a pivot 273 supports a governor lever having a short arm 274 carrying a plunger 275 which works through a sleeve 276 fixed on the disk. The lever also has an arcuate long arm 277 carrying a governor ball 278 which oscillates between padded stop members 279 and 280. A compression spring 281 is mounted on the plunger 275 and biases the ball 278 towards the stop 280 which limits the inmost position of the ball as when the shaft 37 is stopped. Pivoted to the bracket is a bell crank having an upstanding arm 282 provided with a laterally bent end and a horizontal arm 283. The short arm 274 carries on its outer end a trip head 284 which by the action of the governor is projected beyond the bent upper end of the arm 282 so that the trip arm may pass without engaging the arm 282. When, however, the shaft slows down, as in coming to rest, the head 284 is brought into the path of the bent end of arm 282 and biases the bell crank so that the arm 282 tilts outwardly and arm 283 tilts downwardly. Connected to the outer end of the arm 283 is the lower end of a connecting rod 285. Mounted on a support 286 (Fig. 14) is a bracket 287 carrying bearings 288 which support a shaft 289. On the shaft 289 is mounted a sleeve 290 from which projects a rock arm 291 to which the upper end of the rod 285 is connected. The sleeve 290 also carries an upstanding rock arm 292 having a notch 293 at one side of its end. In running position a pin 294 is engaged in this notch and this pin is carried by a lever pivoted intermediate its ends to a bracket 295 to provide an outer arm 296 to which the pin is affixed and an inner trip arm 297. A spring 298 is connected at its upper end to the arm 296 and at its lower end to the bracket 287. This tends to bias the arm 297 upwardly but, so long as the shaft 37 is running, the notch 293 will engage the pin 294 and hold the arm down, when the pin 294 on arm 296 is raised in engagement with notch 293 on rock arm 292.

A bracket 299 supports the valve 258. The valve 258 includes a cylindrical casing 300 having an open lower end provided with a flange 301 resting on the bracket 299 and secured thereto by bolts 302. A nipple 303 is screwed into the upper end of the casing 300 and in this nipple is screwed the supply pipe 257. In the casing 300 is formed a pair of partitions 304 and 305. These partitions are so located that the outlet pipe 259 leads from the casing 300 between the partitions. In the partition 304 is screwed a nipple 306 having a valve seat 307 formed on its lower end. A nipple 308 is screwed in the partition 305 and is provided at its upper end with a valve seat 309. The nipple 308 has a partition 310 in its lower part and is provided with a central valve stem opening around which are arranged air vents 311. A valve stem 312 passes through this valve stem opening and carries a double faced valve 312' on its upper end between the valve seats, space being left between the seats so that each seat will be open when the other is closed. A plug 313 fits in the lower end of the casing and has an opening which provides a guide for the valve stem 312. A vent port 314 is formed in the casing below the partition 305. The valve stem passes downwardly through an opening 315 in the bracket 299 and terminates above the free end of the lever arm 297 in slightly spaced relation thereto. A spring 316 (Fig. 14) has its lower end connected to a bracket 317 formed on or fixed to the connecting rod 285 and the upper end of this spring is connected suitably to the bracket 287.

Figure 15:
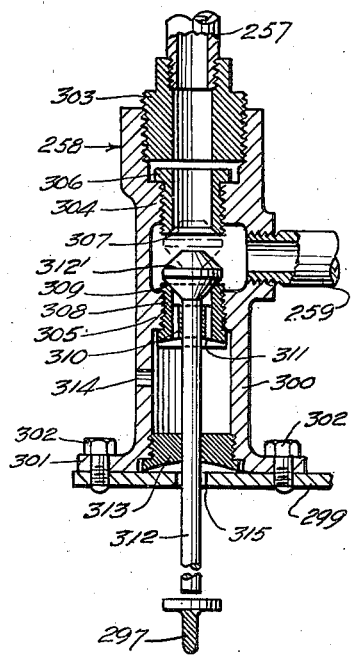
Fig. 15 is an enlarged detail section on the line 15—15 of Fig. 14 showing the air line control valve used herein.

As shown in Fig. 15 the valve is shown in full lines as closing the lower valve, this being its normal running position, and in broken lines in position to close the upper valves.

It will be noted, from what has previously been explained in relation to the governor, that so long as the governor disk is rotating the bell crank 282, 283 will be held with the arm 283 raised, this being effected by the spring 316. This of course will hold the lever arm 296 latched upwardly. The valve will be held in the normal full line position by its weight and the air pressure on top of the valve. If, however, the shaft 37 stops there the bell crank will be tilted, the rock arm 292 swung to release the lever arm 296 which will permit it to be pulled down by the spring 289. The arm 297 will swing up, engage the valve stem 312 and raise the valve 312' to the broken line position of Fig. 15. This will close the entry of air from 257 and at the same time will permit the air under pressure to escape from the header 260 and pipes connected thereto through the vents 311 and 314.

*The gumming head control valves*

The detail of construction and operation of the valve 266 is shown in Figs. 20 to 25, inclusive. The other valves are identical in construction. The valve 266 comprises a casing 318 having an inverted frusto-conical bottom 319 having a central depending tubular boss 320. The top of the casing is closed by a cover 321 held to the casing by screws 322. A gasket 323 is interposed between the cover and casing to provide an air tight joint. The cover 321 is provided with a screw threaded opening in which is screwed one of the pipes leading from the header 260, the pipe here shown being the pipe 263. In the bottom 319 of the casing 318 is a pair of ports 324 and 325 to which are connected one pair of the pipes leading to the particular gumming head controlled by the corresponding valve. In each instance the pipe to the upper or air cylinder is connected to the port 325 and the pipe leading to the lower or adhesive cylinder is connected to the port 324. In the casing 318 is an inverted frusto-conical valve 326 having a valve stem 327 which projects downward through the boss to terminate well below the boss so that an operating lever 328 can be adjustably mounted on said valve stem. The valve 326 is provided with a circular port 329 which may be brought into and out of registry with the port 325 by rotation of the valve. The valve is also provided with an arcuate port 330 which may similarly be caused to register with the port 324. Also a grooved passage 331 is formed on the under side of the valve 319 and in a certain position of the valve the passage 331 will register with the port. The valve casing is also provided with an exhaust port 332 wherewith the passage 331 may register at the time it registers with the port 325 so that the air may be exhausted from beneath the upper or air cylinder of the respective gumming head.

To operate the valves 264, 265, and 266 the shaft 87 has three grooved cams 333, 334, and 335, which actuate respective bell crank levers 336, 337, and 338. Links 339, 340, and 341 connect the bell cranks with the operating levers 328 of the several valves. It is understood that the cams 333, 334, and 335 are so positioned on the shaft 87 that the valves operate in proper sequence.

The operation of each valve is as follows: The normal position of the valve 326 is shown in Fig. 21 and in that position the ports 329 and 330 are in closed position so that no air can flow to the gumming head which is connected to the particular valve. The operation of the valves is also timed in relation to the downward movement of the gumming heads, as previously described. The respective gumming heads move down and the valve now moves in the direction of the arrows until the ports 330 and 324 register, which admits air to the lower cylinder so long as the forward end of the port 330 registers with port 324. In this position air simply blows out between the air and adhesive nozzles. Movement of the valve continues and the port 329 registers with the port 325, the rear end of the port 324 now registering with the rear end of port 330. The valve is now fully open and, while air still continues to flow to the lower cylinder of the gumming head, the air will flow to the upper cylinder and raise the piston, thus opening the adhesive nozzles for the flow of adhesive. The valve 326 starts in reverse motion and when the position shown in Fig. 24 is reached the passage 331 connects the ports 325 and 332 so that air will be exhausted from the space beneath the piston in the upper cylinder so that the needle valve or valves will close. Now it is to be noted that the needle valves have tips 231'. When the needle valves close these tips clear the passage in the points of the adhesive nozzles 226. At the same time the port 330 will move until the port 324 registers with its forward end. Thus after the needle valves close air will continue to blow through the space between the air nozzle 231 and adhesive nozzles 226 and clean the tips 231'. Thus any clogging of the adhesive nozzles, or jamming of the needle valves is prevented.

*Adhesive storage and supply*

Mounted on top of the frame is an adhesive tank 342 having a glazed sight opening 343 through which the height of the tank contents may be observed. This tank is closed by a lid 345 carrying a supply pipe 346 whereby adhesive may be introduced into the tank. The lid closes the tank except that a water sealed vent 347, is secured to the cover. Secured to the cover is a bracket 348 whereto is pivoted a bell crank having a long arm 349 and a short arm 350. The arm 349 carries a float 351 which tends to float on the adhesive 352 in the tank. The arm 350 is connected by a link 353 to one arm 354 of a bell crank lever pivoted to a bracket 355 carried by the cover. The remaining arm 356 of this lever carries a valve 357 which is held closed by the action of the float until the adhesive sinks below a predetermined height whereupon the float will move down and open said valve to admit more adhesive. From the tank extend tubes 254', 238, and 254, which lead to the adhesive chambers of the respective gumming heads and each of these tubes has a hand operated control valve 361.

The right hand lever 138, 139 has its arm 138 provided with a stop rail 362 with which a roller 363 on the middle gumming head engages to limit downward movement of that head.

Each side head has an adjustable fold opener 364 of sagitate form to open the indented side folds 365 (Fig. 12) of the bag B to permit introduction of adhesive between them.

The general operation

The operations of the several parts of the mechanisms having been previously described immediately following descriptions of their constructions, it is not deemed necessary to again particularize these operations. In general, however, the operations on a filled bag may be traced as follows:

Through the action of the packaging machine the bag is brought to station A for action thereon by the gumming machine. The movement of the bag ceases for such period of rest as to enable the gumming operations to be performed. As the bag moves into such position the mechanism coupling the upper cam shaft to the lower cam shaft is tripped by the bag and the upper shaft controlling the air supply starts rotation. The first action on the bag itself is that the cam 101 operates to effect closing of the bag at its neck. This is followed by the action of the cam 124 on the mechanism controlled thereby, which causes opening of the mouth of the bag. Then the cam 146 effects lowering of the middle gumming head while the cam 159 effects, through the mechanism controlled thereby, oscillation of the middle gumming head. As this head is lowered and oscillated, the air valve controlling the pipes leading thereto effects opening of the adhesive nozzles of the head and adhesive is applied inside the edge portions of the bag mouth. At the same time the mechanisms controlled by the cams 181 and 182 and the air valve controlled by the cams 333 and 335 operate to effect alternate lowering and opening of the side gumming heads and the deposition of adhesive in the fold portions 365 of the bag. The bag is thus gummed for closing. The gumming heads are now closed and retracted, whereupon the bag is again put in motion by the packaging machine. As the bag leaves the station A the upper cam mechanism is disconnected from the lower cam mechanism and thus the air control valves cease to operate until the next filled bag is moved into position for operation thereon.

Having thus described the invention, what is claimed as new, is:

1. In a gumming machine for filled bags with open mouths, means to pinch the upper part of the bag above its contents to form a flat mouth and closed neck, means to pull the sides of the bag apart above said neck to open the mouth, gumming means for applying adhesive to the inner faces of the opened mouth, other gumming means for applying adhesive to the exterior of the open mouth within the indented side folds thereof, and operating means for operating the foregoing means in timed relation.

2. In a gumming machine for filled bags with open mouths, means to pinch the upper part of the bag above its contents and form a flat mouth and closed neck, mouth opening means for pulling the sides of the mouth apart above said closed neck and exposing the inner faces of the mouth sides, a middle gumming head above the last mentioned means and movable vertically toward and from the bag mouth, operating means for said gumming head effecting vertical and oscillating movements thereof, means for supplying gum to said middle gumming head during an oscillating movement thereof for applying adhesive to said inner faces, lateral gumming heads for applying adhesive to the exterior of the indented side folds of the bag mouth and movable toward and from said bag mouth ends, and operative means for reciprocating said lateral gumming means in timed relation to the movements of the middle gumming head.

3. In a gumming machine for filled bags with open mouths, means to pinch the upper part of the bag above its contents to form a flat mouth and closed neck, means to pull the sides of the bag apart above said neck to open the mouth, gumming means including gumming heads for applying adhesive to the inner faces of the opened mouth, other gumming means including gumming heads for applying adhesive to the exterior of the flat mouth within the indented side folds thereof, operating means for operating the foregoing means in timed relation, air pressure controlled means effecting flow and stoppage of adhesive from said gumming heads, and means to effect operation of said air pressure controlled means in timed relation to the air pressure controlling means.

4. In a gumming machine for filled bags with open mouths, means to pinch the upper part of the bag above its contents and form a flat mouth and closed neck, mouth opening means for pulling the sides of the mouth apart above said closed neck and exposing the inner faces of the mouth sides, a middle gumming head above the last mentioned means and movable vertically toward and from the bag mouth, operating means for said gumming head effecting vertical and oscillating movements thereof, means for supplying gum to said middle gumming head during an oscillating movement thereof for applying adhesive to said inner faces, lateral gumming heads for applying adhesive to the exterior of the indented side folds of the bag mouth and movable toward and from said bag mouth ends, operative means for reciprocating said lateral gumming means in timed relation to the movements of the middle gumming head, air pressure controlled means effecting flow and stoppage of adhesive from said heads, and means to effect operation of said air pressure controlled means in timed relation to the head controlling means.

5. In a gumming machine for filled bags with open mouths, means to pinch the upper part of the bag above its contents to form a flat mouth and closed neck, means to pull the sides of the bag apart above said neck to open the mouth, gumming means including gumming heads for applying adhesive to the inner faces of the opened mouth, other gumming means including gumming heads for applying adhesive to the exterior of the flat mouth at the indented side folds thereof, operating means for operating the foregoing means in timed relation, air pressure controlled means effecting flow and stoppage of adhesive from said gumming heads, means to effect operation of said air pressure controlled means in timed relation to the air pressure controlling means, an adhesive storage tank, and manually controlled means for conducting adhesive from the tank to the several heads.

6. In a gumming machine for filled bags with open mouths, means to pinch the upper part of the bag above its contents and form a flat mouth and closed neck, mouth opening means for pulling the sides of the mouth apart above said closed neck and exposing the inner faces of the mouth sides, a middle gumming head above the last mentioned means and movable vertically toward and from the bag mouth, operating means for said gumming head effecting vertical and oscillating movements thereof, means for supplying gum to said middle gumming head during an oscillating movement thereof for applying adhesive to said inner faces, lateral gumming heads for applying adhesive to the exterior of the ends of the bag mouth and movable toward and from said bag mouth ends, operative means for reciprocating said lateral gumming means in timed relation to the movements of the middle gumming head, air pressure controlled means effecting flow and stoppage of adhesive from said heads, means to effect operation of said air pressure controlled means in timed relation to the head controlling means, an adhesive storage tank, and manually controlled means for conducting adhesive from the tank to the several heads.

7. In a gumming machine for filled bags with open mouths, means to pinch the upper part of the bag above its contents to form a flat mouth and closed neck, means to pull the sides of the bag apart above said neck to open the mouth, gumming means including gumming heads for applying adhesive to the inner faces of the opened mouth, other gumming means including gumming heads for applying adhesive to the exterior of the flat mouth at the ends thereof, operating means for operating the foregoing means in timed relation, air pressure controlled means effecting flow and stoppage of adhesive from said gumming heads, means to effect operation of said air pressure controlled means in timed relation to the air pressure controlling means, and means to effect engagement and disengagement of the air pressure controlling means to and from the means for operating the gumming heads.

8. In a gumming machine for filled bags with open mouths, means to pinch the upper part of the bag above its contents to form a flat mouth and closed neck, means to pull the sides of the bag apart above said neck to open the mouth, gumming means including gumming heads for applying adhesive to the inner faces of the opened mouth, other gumming means including gumming heads for applying adhesive to the exterior of the flat mouth at the ends thereof, operating means for operating the foregoing means in timed relation, air pressure controlled means effecting flow and stoppage of adhesive from said gumming heads, means to effect operation of said air pressure controlled means in timed relation to the air pressure controlling means, an adhesive storage tank, manually controlled means for conducting adhesive from the tank to the several heads, and means to effect engagement and disengagement of the air pressure controlling means to and from the means for operating the gumming heads.

9. In a machine of the kind described, a rotatable cam shaft, a cam thereon, a rock lever actuated in one direction by said cam, a pair of gear connected rock shafts, a rock lever secured on one of said rock shafts, a connecting rod having its ends connected to said rock levers, a pair of arms carried by said rock shafts, a pair of bag closing blades positioned opposite each other and movable toward and from each other opposite the upper part of the bag, links connecting said arms to said blades, and spring means holding the first rock lever against the cam.

10. In a machine of the class described, a rotatable cam shaft, a cam thereon, a rock lever actuated in one direction by said cam, a connecting rod having its lower end connected to said rock shaft, a bell crank having one arm connected to the upper end of said connecting rod, a pair of gear connected rock levers, a rock arm connected fixedly to one of said rock levers, a link connecting the last mentioned rock arm with the remaining arm of the bell crank, a pair of connecting rods, each having its upper end connected to a respective rock lever, a pair of rock levers pivoted between their ends to provide outer arms and inner arms, said pair of connecting rods being connected to said outer arms, bag mouth opening fingers on the said inner cams, and spring means for holding the first rock lever against its cam.

11. In a device of the kind described, a gumming head, a frame rockingly supporting said gumming head, means to guide said head in a vertical path, a cam shaft, a cam fixed thereon, a rock lever actuated by said cam, a connecting rod having its lower end connected to the rock shaft, a rock lever pivoted intermediate its ends, said connecting rod being connected to one end of the last mentioned lever, a link connecting the other end of said last lever with said frame, and means to rock said gumming head in said frame.

12. In a device of the kind described, a gumming head, a frame rockingly supporting said gumming head, means to guide said head in a vertical path, a cam shaft, a cam fixed thereon, a rock lever actuated by said cam, a connecting rod having its lower end connected to the rock shaft, a rock lever pivoted intermediate its ends, said connecting rod being connected to one end of the last mentioned lever, a link connecting the other end of said last lever with said frame, a second cam shaft geared to the first shaft, a second cam on said second shaft, a two armed rock lever having a lower arm controlled by said second cam, a link having one end connected to the other arm of said two armed lever, a second two armed rock lever having a lower arm to which the last mentioned link is connected, a rack bar guided for longitudinal movement, a link connecting the second two armed rock levers with said rack bar, a gear segment meshing with said rack bar, a slotted arm extending from said segment, said gumming head having trunnions on which the head is mounted in the frame, an arm mounted on one of said trunnions, and a pin on the end portion of the last named arm.

13. In a device of the kind described, a pair of diagonally disposed guides, a pair of slides mounted in said guides, a pair of bell crank structures, each having link connection to a respective slide, a pair of gumming heads, each carried by a respective slide, a cam shaft, a pair of cams on said shaft, a second pair of bell crank structures actuated by said cams, and connecting rods connecting the first pair of bell crank structures with the second pair thereof, said cams being positioned to effect alternate depression of the gumming heads.

14. In a device of the kind described, a gumming head, a frame rockingly supporting said gumming head, means to guide said head in a horizontal path in a vertical plane, means to raise and lower said frame, means to rock said gumming head in said frame, and means for feeding adhesive through said head under pressure while traversing said path.

HELMER ANDERSON.